United States Patent [19]

Davene

[11] 4,423,514

[45] Dec. 27, 1983

[54] CONTINUOUSLY FED ELECTRIC FURNACE FOR MELTING SCRAP IRON

[75] Inventor: Jean Davene, Villars, France

[73] Assignee: Clesid S. A., Saint-Chamond, France

[21] Appl. No.: 325,951

[22] Filed: Nov. 30, 1981

[30] Foreign Application Priority Data

Jan. 20, 1981 [FR] France .............................. 81 00996

[51] Int. Cl.³ .............................................. F27D 3/04
[52] U.S. Cl. ...................................... 373/79; 414/160
[58] Field of Search ................... 373/79, 81; 414/153, 414/160, 167, 180, 199; 432/239

[56] References Cited

U.S. PATENT DOCUMENTS 1,522,665  1/1925  Wright .................................. 373/79
3,372,223  3/1968  Menegoz et al. ..................... 373/79
3,665,085  5/1972  Dumont-fillon ..................... 373/81

Primary Examiner—Roy N. Envall, Jr.
Attorney, Agent, or Firm—Pollock, Vande Sande & Priddy

[57] ABSTRACT

Energy efficient arc furnace suitable for continuous melting of ungraded scrap iron as found in the trade, and four or more meters in length. Its inner part includes a storage zone (4) located laterally of and above the hearth (1), and arranged so that a considerable volume of scrap iron can be stored there. A pusher (11) is arranged at the bottom of the side storage zone for the purpose of pushing the base of the pile (10) of scrap iron stored in the said zone towards the hearth. The upper portion of the storage zone is equipped with an opening (8) of the trap or door for feeding in cold scrap iron (13, 131), and the storage zone is connected to a conduit (6) for exhausting fumes so that these pass through it.

3 Claims, 4 Drawing Figures

CONTINUOUSLY FED ELECTRIC FURNACE FOR MELTING SCRAP IRON

FIELD OF THE INVENTION

The present invention relates to an energy efficient electric arc furnace suitable for continuous melting of ungraded scrap iron as found in the trade, and four or more meters in length.

BACKGROUND

There are known electric furnaces, such as that described in French Patent No. 2.065.880, which can be continuously fed with short scrap iron or sponge iron. Such furnaces use charging openings of small diameter located in the roof of the furnace, and are clearly unable to operate with scrap iron in large sizes.

SUMMARY OF THE INVENTION

The electric furnace according to the present invention has the advantage of being able to be continuously fed with scrap iron in large sizes. Also, whatever the size of the scrap iron, the heat of the fumes can be recovered, allowing a reduction in the electrical energy necessary for melting. It is of the type comprising a hearth which is fixed in position, its inner part comprising a storage zone located at the side of the hearth, externally of and above the latter, and arranged so that a considerable volume of scrap iron can be stored there, a pusher being located at the bottom of the said side storage zone and arranged so as to be able to push the base of the pile of scrap iron stored in the said zone towards the hearth. The said side zone is equipped with an opening of the trap or door type located at its upper part so as to be feedable with cold scrap iron, and is connected to the conduit for exhausting the fumes from the furnace, so that the said fumes pass through it.

BRIEF DESCRIPTION OF THE DRAWINGS

The invention will be made clearer by means of the following description of an embodiment, with reference to the attached drawings in which.

DETAILED DESCRIPTION OF AN EMBODIMENT

Figure 1:
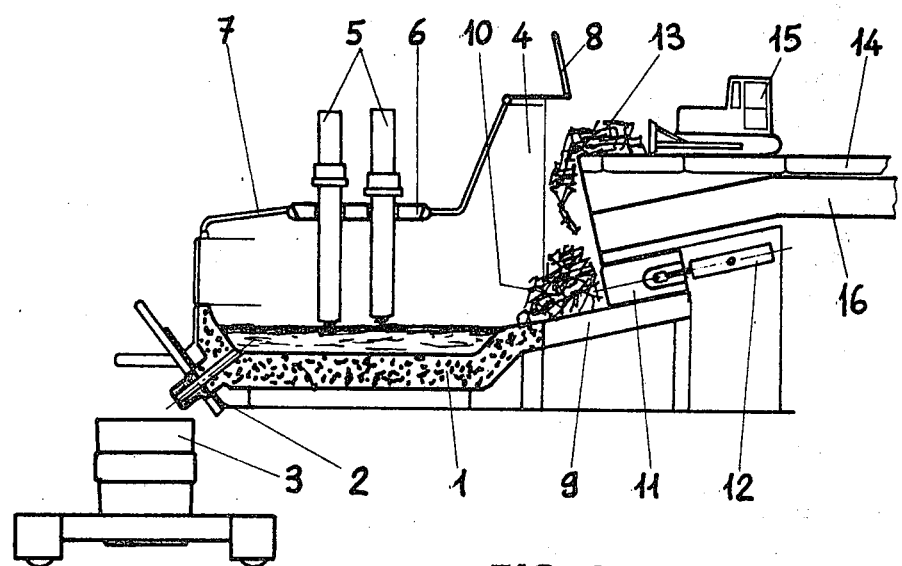
FIG. 1 is a diagrammatic side view of the apparatus of the invention, showing the introduction according to cold scrap iron into the furnace chamber.
Figure 4:
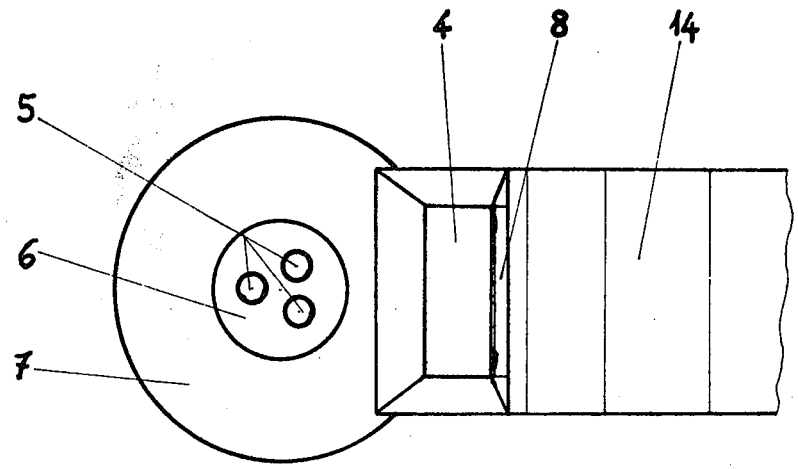
FIG. 4 is a diagrammatic plan view of the installation of the invention.

In FIGS. 1 and 4, the electric furnace according to the invention, which is a furnace fixed in position and comprising a conventional hearth 1 made of refractory material provided with an outlet for liquid steel to a ladle 3, the outlet being constituted by a conventional nozzle 2 with a sliding valve, is shown to have a chamber which comprises, beside the hearth 1, a large interior space 4 for preliminary storage of cold scrap iron before it is introduced into the melting zone, i.e., onto the hearth 1, where the electric arcs from the electrodes 5 act.

Space 4 has a volume, which is at least a third of the whole volume of the furnace chamber, so that scrap iron in large sizes can readily be introduced into it and a considerable volume of scrap iron can also be stored. Space 4 is connected to the conduit 16 for exhausting the fumes from the furnace, so that the said fumes pass through it. This allows the best use to be made of the particular advantage of the invention which consists in recovering the heat of the fumes so as to obtain preheating of the scrap iron before it is introduced into the melting zone. Preferably, as described example, the space 4 is of considerable height, e.g., of the order of twice or three times that of the central part 6 of the roof of the furnace. This seen hereinafter, a particularly advantageous implementation allows the space 4 to be easily fed with cold scrap iron by means of a trap or door 8 positioned at the upper part of the said space, and it also allows maximum use of the preheating of the scrap iron due to the fumes, since it is possible to feed the hearth only with the scrap iron located at the lower part of the pile 10 stored in the space 4, i.e., the hottest because it is located nearest the active region of the hearth, and because it has remained in the space 4 for a longer time than the scrap iron at the upper part of the said pile 10.

As shown in FIGS. 1 and 4, because of the presence of the storage space 4 of the invention, the inner chamber of the furnace has a distorted shape which would be very difficult to achieve with refractory material: except for the hearth 1 and the region 6 made of refractory material and except for the largest part 9 of the floor of the space 4 made in a massive constructional form and inclined towards the hearth as represented in FIG. 1, the walls and the roof of the furnace are metal and in the hottest parts include regions cooled by the circulation of water or other fluid, this technique being conventional now in the constitution of the walls of electric furnaces.

Also, to make it possible to regularly push the lower part of the pile 10 of scrap iron stored in the space 4 towards the melting zone, a steel block 11 serving as pushing member and actuated by an actuator 12 is positioned, in its withdrawn position as represented in FIG. 1, on the part of the inclined floor 9 which is outside the furnace vessel. As the drawing shows, in its withdrawn position the front face of the pusher block 11 is advantageously located at the boundary of or outside the storage space 4, so as not to get in the way of the formation of the pile 10.

FIG. 1 shows the stage of introducing into the storage space 4 of the invention a portion 13 of cold scrap iron to be added to the pile 10 of already preheated scrap iron contained by the said space 4.

To introduce the portion 13, which is on the work floor 14, the side door 8 is opened, by upward swinging, and the said portion of cold scrap iron is then pushed, by means of a bulldozer 15, inside the space 4 in which it falls on the top of the pile 10.

Figure 2:
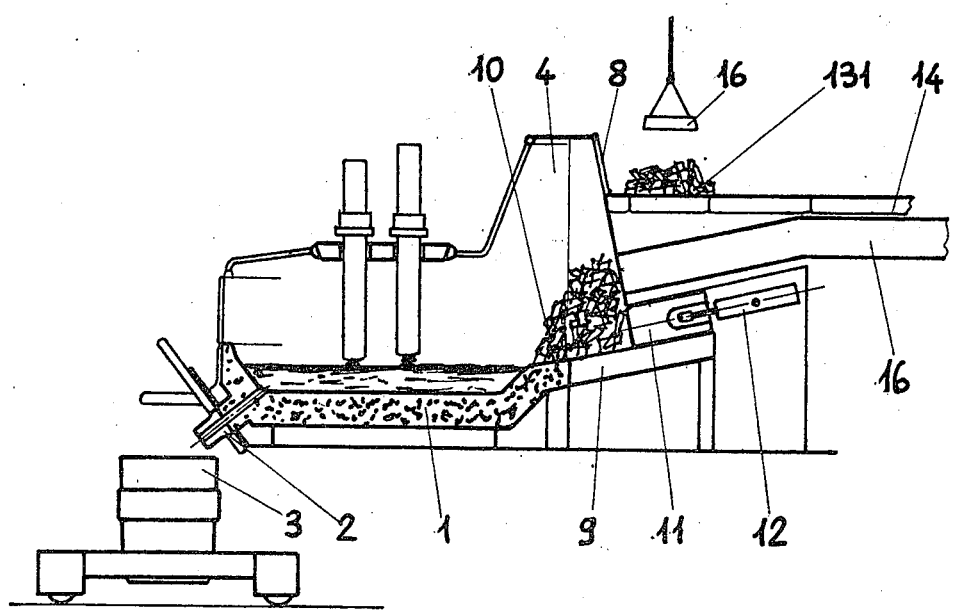
FIG. 2 is a diagrammatically a new stock of cold scrap iron being brought in front of the charging door of the furnace.

Then, as shown in FIG. 2, the side door 8 is closed again and a new portion 131 of cold scrap iron is brought onto the work floor 14 of the steelworks, by means of an electromagnet 16.

Figure 3:
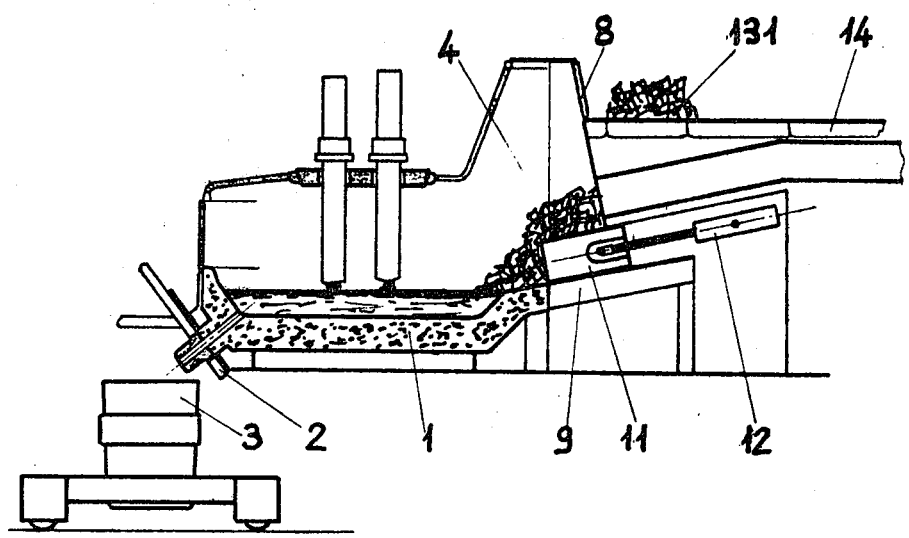
FIG. 3 shows diagrammatic side view showing the stage of pushing preheated scrap iron towards the melting zone.

Then, as shown in FIG. 3, the pushing member 11 is brought forward, by extension of the rod of the actuator 12. As clearly shown in the drawing, this has the effect of introducing into the melting space bounded by the hearth 1 solely the lower part of the pile 10 of scrap iron, this part being the hottest not only because it is located nearest the zone of maximum radiation but also because it has remained for the longest time in the storage space 4, as can be seen from FIGS. 1 and 2, and because the fumes drawn in by the exhaust conduit 16 have passed through it.

I claim:

1. Electric melting furnace with continuous feeding and hearth fixed in position, comprising (a) an inner chamber comprising an area directly above said hearth and a contiguous storage space (4) open to and lateral to said space and above the level of said hearth (1), said space being arranged for the storage of a large quantity of large size scrap iron;

(b) a pusher (11) located at the bottom of said storage space for pushing the base of a pile (10) of scrap iron stored in said space towards said hearth; and (c) an opening (8) of the trap or door type at the upper part of said storage space for the selective feeding of cold scrap iron (13, 131) therethrough;

(d) said storage space being connected to a conduit for exhausting the fumes of said furnace so that said fumes are caused to pass through the latter.

2. Electric furnace according to claim 1, wherein the height of said storage space (4) is greater than that of the roof (7) of said furnace.

3. Electric furnace according to claims 1 or 2, wherein said storage space (4) has a volume equal to at least one third of the inner volume of said furnace.

* * * * *